US010696555B2

(12) United States Patent
Stiller

(10) Patent No.: US 10,696,555 B2
(45) Date of Patent: *Jun. 30, 2020

(54) PROCESS FOR PURE CARBON PRODUCTION

(71) Applicant: WEST VIRGINIA UNIVERSITY RESEARCH CORPORATION, Morgantown, WV (US)

(72) Inventor: Alfred H. Stiller, Morgantown, WV (US)

(73) Assignee: WEST VIRGINIA UNIVERSITY RESEARCH CORPORATION, Morgantown, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,060

(22) Filed: Sep. 24, 2018

(65) Prior Publication Data
US 2019/0119117 A1    Apr. 25, 2019

Related U.S. Application Data

(63) Continuation of application No. 15/618,802, filed on Jun. 9, 2017, now Pat. No. 10,144,648, which is a continuation of application No. 14/213,533, filed on Mar. 14, 2014, now Pat. No. 9,701,539.

(60) Provisional application No. 61/798,198, filed on Mar. 15, 2013.

(51) Int. Cl.
| | |
|---|---|
| C01B 32/25 | (2017.01) |
| C01B 32/26 | (2017.01) |
| B01J 19/24 | (2006.01) |
| C01F 11/28 | (2006.01) |
| C01F 7/58 | (2006.01) |
| C01B 32/05 | (2017.01) |
| C01B 32/184 | (2017.01) |
| C01B 32/36 | (2017.01) |

(52) U.S. Cl.
CPC .............. *C01B 32/25* (2017.08); *B01J 19/24* (2013.01); *C01B 32/05* (2017.08); *C01B 32/184* (2017.08); *C01B 32/26* (2017.08); *C01B 32/36* (2017.08); *C01F 7/58* (2013.01); *C01F 11/28* (2013.01)

(58) Field of Classification Search
None
See application file for complete search history.

(56) References Cited

U.S. PATENT DOCUMENTS

| | | |
|---|---|---|
| 380,775 A | 4/1888 | Thowless |
| 1,271,713 A | 7/1918 | Hutchins |
| 1,319,148 A | 10/1919 | Freeman |
| 1,528,824 A | 3/1925 | Hackspill et al. |
| 1,889,951 A | 12/1932 | Cox |
| 2,323,597 A | 7/1941 | Hansgirg |
| 2,382,713 A | 8/1945 | Hansgirg |
| 2,729,689 A | 1/1956 | Blanchard et al. |
| 2,739,041 A | 3/1956 | Andersen |
| 2,760,847 A | 8/1956 | Oblad et al. |
| 2,813,017 A | 11/1957 | Matheiu |
| 2,892,762 A | 7/1959 | Stern et al. |
| 3,031,413 A | 4/1962 | Barber |
| 3,066,099 A | 11/1962 | Mohun |
| 3,201,052 A | 8/1965 | Feldmann et al. |
| 4,105,440 A | 8/1978 | Gentaz et al. |
| 4,275,050 A | 6/1981 | French et al. |
| 4,508,666 A | 4/1985 | Pietzarka et al. |
| 4,738,759 A | 4/1988 | Bienvenu et al. |
| 4,820,339 A | 4/1989 | Bienvenu et al. |
| 4,990,403 A | 2/1991 | Ito |
| 5,384,016 A | 1/1995 | Lin et al. |
| 5,560,898 A | 10/1996 | Uchida et al. |
| 5,599,624 A | 2/1997 | Prochazka |
| 5,680,292 A | 10/1997 | Thompson, Jr. et al. |
| 5,997,832 A | 12/1999 | Lieber et al. |
| 6,214,309 B1 | 4/2001 | Shaw et al. |
| 6,451,279 B1 | 9/2002 | Froes et al. |
| 6,479,028 B1 | 11/2002 | Kaner et al. |
| 6,514,897 B1 | 2/2003 | Moy et al. |
| 6,579,833 B1 | 6/2003 | McNallan et al. |
| 6,670,058 B2 | 12/2003 | Muradov |
| 6,793,875 B1 | 9/2004 | Shaw et al. |
| 6,995,115 B2 | 2/2006 | Wang et al. |
| 7,025,945 B2 | 4/2006 | Nishi et al. |
| 7,157,167 B1 | 1/2007 | Muradov |
| 7,744,843 B2 | 6/2010 | Gogotsi |
| 7,972,725 B2 | 7/2011 | Krause et al. |

(Continued)

FOREIGN PATENT DOCUMENTS

| | | |
|---|---|---|
| CN | 1498976 | 5/2004 |
| CN | 1590288 A | 3/2005 |

(Continued)

OTHER PUBLICATIONS

Atkins, Elements of Physical Chemistry, NIST webbook (2009).
Bae et al: "Roll-to-roll production of 30-inch graphene films for transparent electrodes", Nature Nanotechnology, val. 5, No. 8, Aug. 1, 2010 (Aug. 1, 2010), pp. 574-578, XP055049935, ISSN: 1748-3387, DOI: 10.1038/nnano.2010.132.

(Continued)

*Primary Examiner* — Guinever S Gregorio

(74) *Attorney, Agent, or Firm* — STIP Law Group, LLC

(57) ABSTRACT

The disclosure provides for methods of oxidizing carbide anions, or negative ions, from salt like carbides at low temperatures below about 600° C. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

10 Claims, No Drawings

(56) References Cited

U.S. PATENT DOCUMENTS

| | | | |
|---|---|---|---|
| 8,242,030 B2 | 8/2012 | Hannon et al. | |
| 9,701,539 B2* | 7/2017 | Stiller | C01F 11/28 |
| 9,764,958 B2* | 9/2017 | Stiller | C01F 11/28 |
| 10,035,709 B2* | 7/2018 | Stiller | C01F 11/28 |
| 10,144,648 B2* | 12/2018 | Stiller | C01F 11/28 |
| 2001/0047980 A1 | 12/2001 | McNallan et al. | |
| 2002/0151604 A1 | 10/2002 | Detering et al. | |
| 2002/0197200 A1 | 12/2002 | Froes et al. | |
| 2003/0008772 A1 | 1/2003 | Ma et al. | |
| 2004/0028948 A1 | 2/2004 | Nishi | |
| 2005/0058875 A1 | 3/2005 | Jerome | |
| 2005/0063900 A1 | 3/2005 | Wang et al. | |
| 2005/0170181 A1 | 8/2005 | Nishi et al. | |
| 2005/0171370 A1 | 8/2005 | Nishi et al. | |
| 2006/0068125 A1 | 3/2006 | Radhakrishnan | |
| 2006/0140846 A1 | 6/2006 | Leis et al. | |
| 2006/0165584 A1 | 7/2006 | Gogotsi et al. | |
| 2006/0165988 A1 | 7/2006 | Chiang et al. | |
| 2006/0251565 A1 | 11/2006 | Leis et al. | |
| 2008/0159938 A1 | 7/2008 | Mauthner et al. | |
| 2008/0169749 A1 | 7/2008 | Kim et al. | |
| 2008/0210908 A1 | 9/2008 | Zhu et al. | |
| 2008/0219913 A1 | 9/2008 | Gogotsi | |
| 2008/0248310 A1 | 10/2008 | Kim et al. | |
| 2008/0263954 A1 | 10/2008 | Hammel et al. | |
| 2009/0036302 A1 | 2/2009 | Gogotsi et al. | |
| 2009/0087543 A1 | 4/2009 | Nicholas | |
| 2009/0117094 A1 | 5/2009 | Leis et al. | |
| 2009/0213529 A1 | 8/2009 | Gogotsi et al. | |
| 2009/0258782 A1 | 10/2009 | Gogotsi | |
| 2009/0301902 A1 | 12/2009 | Gogotsi et al. | |
| 2010/0012576 A1 | 1/2010 | Hoffman et al. | |
| 2010/0233546 A1 | 9/2010 | Nesper et al. | |
| 2011/0033366 A1 | 2/2011 | Wagner | |
| 2011/0123428 A1 | 5/2011 | Liu et al. | |
| 2011/0287174 A1 | 11/2011 | Calabrese Barton et al. | |
| 2011/0290655 A1 | 12/2011 | Nishikiori et al. | |
| 2012/0148473 A1 | 6/2012 | Kramarenko | |
| 2012/0219488 A1 | 8/2012 | Dash | |
| 2012/0241327 A1 | 9/2012 | Suib et al. | |
| 2012/0256121 A1 | 10/2012 | Wolf et al. | |
| 2014/0142007 A1 | 5/2014 | Lim et al. | |
| 2014/0271441 A1 | 9/2014 | Stiller | |
| 2014/0311292 A1 | 10/2014 | McCann | |
| 2014/0328749 A1 | 11/2014 | Hammel et al. | |
| 2015/0071847 A1 | 3/2015 | Ishikawa et al. | |
| 2015/0191355 A1 | 7/2015 | Kang et al. | |
| 2015/0210547 A1 | 7/2015 | Kang et al. | |
| 2016/0002049 A1 | 1/2016 | Stiller | |
| 2016/0115600 A1 | 4/2016 | Stiller et al. | |

FOREIGN PATENT DOCUMENTS

| | | |
|---|---|---|
| CN | 101125652 | 2/2008 |
| CN | 100439238 C | 12/2008 |
| CN | 102390828 A | 3/2012 |
| CN | 103436904 A | 12/2013 |
| CN | 105037988 | 11/2015 |
| DE | 1667532 | 7/1971 |
| DE | 259147 A1 | 8/1988 |
| EP | 1916233 A1 | 4/2008 |
| FR | 1071197 | 8/1954 |
| JP | S 52-128525 | 4/1976 |
| JP | 58-501430 | 8/1983 |
| JP | 7-48111 | 7/1995 |
| JP | 11302826 | 11/1999 |
| JP | 2008-105922 | 5/2008 |
| JP | 2008-542184 | 11/2008 |
| JP | 2011-037693 | 2/2011 |
| JP | 2012-166980 | 9/2012 |
| KR | 10-1472313 | 12/2014 |
| RU | 2181795 C2 | 4/2002 |
| SU | 996324 A1 | 2/1983 |
| SU | 1175869 A1 | 8/1985 |
| WO | WO 83/00038 | 1/1983 |
| WO | WO 2001/016054 | 3/2001 |
| WO | WO 2002/086180 | 10/2002 |
| WO | WO 2004/094307 A1 | 4/2004 |
| WO | WO 2005/030391 | 4/2005 |
| WO | WO 2006/127017 A2 | 11/2006 |
| WO | WO 2008/102357 A2 | 8/2008 |
| WO | WO 2013/086273 | 6/2013 |
| WO | WO 2014/019880 A1 | 2/2014 |
| WO | WO 2014/144374 | 9/2014 |

OTHER PUBLICATIONS

Banhart, "Chains of carbon atoms: A vision or a new nanomaterial?", Beilstein J. of nanotechnology, vol. 6, (2015) pp. 559-569.

Bonaccorso et al., "Production and processing of graphene and 2d crystals", Materials Today, vol. 15(12), (2012) pp. 564-589.

Camargo et al., "Carbide-Derived Carbon by Electrochemical Etching of Vanadium Carbides", J. Electrochem. Soc.., 2015, 162, 10, H811-H815.

Carbon Nanomaterials, 2nd Ed., CRC Press, 2014, Chapter 11, "Carbide-Derived Carbon," (Y. Korenblit et al.), pp. 303-329.

Chen, Electrodeposition of Diamond-Like Carbon Films, Thesis, 2002, Univ. N. Texas.

Cherkasov et al., Carbon, vol. 36, pp. 324-329.

Chu et al., "Characterization of amorphous and nanocrystalline carbon films", Materials Chemistry and Physics, 96 (2006) pp. 253-277.

Cotton & Wilkinson, Ed., Advanced Inorganic Chemistry, 4th ed., 1980, pp. 361-363.

Dai et al., "Synthesis of nanostructured carbon by chlorination of calcium carbide at moderate temperatures and its performance evaluation", Mat. Chem. Phys., 112, 2, 2008, pp. 461-465.

Dimovski et al.; Synthesis of Graphite by Chlorination of Iron Carbide at Moderate Temperatures; J. Mater. Chem.; 14, 238-243 (2004).

Gogotsi et al., "Formation of sp3-bonded carbon upon hydrothermal treatment of SiC", Diamond and Related Materials, vol. 5 (1996), pp. 151-162.

Gogotsi, (Ed.), Carbon Nanomaterials, 2006, Chapter 6, "Carbide-Derived Carbon," (G. Yushin et al.), pp. 211-254.

Gogotsi et al., "Nanoporous Carbide Derived Carbon with Tunable Pore Size", Nature Materials, vol. 2 (9), 2003, 591-594 (Retrieved from http://repository.upenn.edu/mse_papers/60).

Han et al., "Preparation of Carbon Nano-Onions and Their Applicatio as Anode Materials for Rechargeable Lithium-Ion Batteries", J. Phys. Chem. C2011, 115, pp. 8923-8927.

Kawamura et al, "Electrodeposition of cohesive carbon films on aluminum in a LiCl—KCl—K2CO3 melt", J. Appl. Electrochem., 30: 571 (2000).

Kraft et al., "Carbon formed by hydrothermal treatment of α-SiC crystals",J. Mater. Chem., vol. 10, (2000) pp. 671-680.

Kulak et al., "Electrodeposition of Nanostructured Diamond-like Films by Oxidation of Lithium Acetylide", Electrochemistry Commmunications, vol. 5, Issue 4, Apr. 2003, pp. 301-305.

Lukatskaya et al., Room-Temperature Carbide-Derived Carbon Synthesis by Electrochemical Etching of MAX Phases, Angew. Chem. Int. Ed. Engl. , vol. 53, 19, pp. 4887-4880 (2014).

Morishita et al, "Carbon-coated tungsten and molybdenum carbides for electrode of electrochemical capacitor",Electrochemica Acta, 52, 7, Feb. 1, 2007, 2478.

Odegard et al.; On the Solubility of Aluminum Carbide and Electrodeposition of Carbon in Cryolitic Melts; J. Electrochem. Soc.1 088-1 092; May 1987.

Pang et al. , "Synthesis of Carbon Spheres via a Low-Temperature Metathesis Reaction", J. Phys. Chem. C, 2008, 112, 12134-12137.

Pillai et al., "Solid-State Synthesis of Calcium Carbide by Using 2.45 GHz Microwave Reactor", Ind. Eng. Chem. Res. 2015, 54(44) 11001-11010, 2015.

Presser, "Oxidation and Wet Wear of Silicon Carbide", PhD dissertation, Universitat Tübingen, (2009).

Presser [Gogotsi] et al., "Carbide-Derived Carbons-from Porous Networks to Nanotubes and Graphene", Adv. Functional Mater., 21, 810-833, (2011).

(56) References Cited

OTHER PUBLICATIONS

Wu et al.,"The effects of electrolyte on the supercapacitive performance of activated calcium carbide-derived carbon", Journal of Power Sources, vol. 226 (2013), pp. 202-209.
Xie et al., "Preparation of high purity carbon nanospheres by the chemical reaction of calcium carbide and oxalic acid", Carbon, 2009, 47, 2292-2295.
Xie et al., "Chemical reactions between calcium carbide and chlorohydrocarbon used for the synthesis of carbon spheres containing well-ordered graphite", Carbon 2010, 48, 2023-2029.
Xie et al., "Low temperature synthesis of high quality carbon nanospheres through the chemical reactions between calcium carbide and oxalic acid", Mater. Chem. Phys., 2010, 124, 482-487.
Yolshina et l., "A novel electrochemical method for the synthesis of boron doped graphene in the molten salt electrolyte", Synthetic Metals, 205 (2015): 85-91.
Zheng et al., "The preparation and performance of calcium carbide-derived carbon/polyaniline composite electrode material for supercapacitors", J. Power Sources, 195, 6, Mar. 5, 2010, 1747.
International Searching Authority (ISA/US), International Application No. PCT/US14/028755, PCT International Search Report, dated Sep. 19, 2014, p. 1-3.
International Preliminary Report on Patentability received in connection with International Application No. PCT/US2014/028755 dated Sep. 15, 2015.
Invitation to pay additional fees and partial search report received in connection with international application No. PCT/US2015/056175; dated Feb. 12, 2016.
Osetzky, "Macrocrystalline Graphite From Magnesium Carbide", Carbon, vol. 12, pp. 517-523, (1974).
Fedorov et al., "Mesoporous carbon Adsorbents from Calcium Carbide", J. Appl. Chem. USSR, 54, 2253-2255, (1982).
Federov et al, "Theoretical Foundations of Carbide-Thermal Technology for Production of Activated Carbon and Sorption-Active Materials", Russ J. Appl. Chem., vol. 71, 584-588, (1998).
Federov et al., "Production, Pore Structure, Adsorption Properties, and Fields of Application of Composite Sorbents from Calcium Carbide", Russ. J. Appl. Chem., vol. 71, 795-798, (1998).
Ivakhnyuk, Z. Prikladnoi Khimii, 60, 852-856, 1987.
Ivakhnyuk, Z. Prikladnoi Khimii, 60, 1413-1415, 1987.
Samonin, Z. Prikladnoi Khimii, 60, 2357-2358, 1987.
International Search Report and Written Opinion received in connection with, International Application No. PCT/US2015/056175, dated May 30, 2016.
Anonymous: "Graphit—Wikipedia", Jul. 15, 2014 (Jul. 15, 2014), XP055273296, Retrieved from the Internet: URL:https://de.wikipedia.org/w/index.php?title=Graphit&oldid=132168437 [retrieved on May 18, 2016].
Anonymous: "Graphene—Wikipedia, the free encyclopedia", Aug. 17, 2014 (Aug. 17, 2014), XP055273317, Retrieved from the Internet: URL:https://en.wikipedia.org/w/index.php title=Graphene &oldid=621692371 [retrieved on May 18, 2016].
Anonymous: "Diamond—Wikipedia, the free encyclopedia", Aug. 5, 2014 (Aug. 5, 2014), XP055273274, Retrieved from the Internet: URL:https://en.wikipedia.org/w/index.phptitle=Diamond&oldid=620007262 [retrieved on May 18, 2016].
Senthilnathan et al., "Synthesis of carbon films by electrochemical etching of SiC with hydrofluoric acid in nonaqueous solvents", Carbon, 71 (2014) pp. 181-189.
Morris et al., "Galvanic Cell Studies Involving Calcium Carbide Solutions", J. Electrochem. Soc., 1973, 120, 4, 570-575.
Boehm et al., "Structural Parameters and Molecular Sieve Properties of Carbons Prepared from Metal Carbides", Proc. 12th Biennial Conf. on Carbon, 149-150, Pergamon, Oxford, 1975.
Yang et al, "Nanostructured tungsten carbide catalysts for polymer electrolyte fuel cells", Applied Physics Letters, vol. 86, 224104 (2005).
Abanades A., et al., "Development of methane decarbonisation based on Liquid Metal Technology for CO2-free production of hydrogen", Int'l J. of Hydrogen Energy, Elsevier Sci. Publishers B.V., Barking GB, vol. 41(19) Dec. 23, 2015, pp. 8159-8167.
Abbas et al., "Hydrogen production by methane decomposition: A review", I nt'l Journal of Hydrogen Energy, 3 5 (2010) 1160-1190.
Aiello et al., "Hydrogen production via the direct cracking of methane over Ni/SiO2", Applied Catalysis A: General, vol. 192 (2000) pp. 227-234.
Chen et al., "Highly active and durable nanostructured molybdenum carbide electrocatalysts for hydrogen production", Energy Environ. Sci. 2013, 6, pp. 943-951.
Chen et al., "In Situ Synthesized Al4C3 Nanorods with Excellent Strengthening Effect in Aluminum Matrix Composites", Adv. Eng. Mat., 2014, vol. 16, No. 8, pp. 972-975.
De Oliveira et al., "Metal Matrix Composites Added of Nanostructured Tantalum Carbide", Sintering Techniques of Materials, 2015, Chapter 6, p. 107 (InTech).
El-Naas et al., "Solid Phase Synthesis of Calcium Carbide in a Plasma Reactor", Plasma Chemistry and Plasma Processing, 18, 3 (1998).
Fan et al. (Eds.) Silicon Carbide Nanostructures, Fabrication, Structure, and Properties, Springer International Publishing Switzerland, (2014).
Gulevich et al., "Technologies for hydrogen production based on direct contact of gaseous hydrocarbons and evaporated water with molten Pb or Pb—Bi", Energy Conversion and Management, Elxwevier Sci. Pub. Oxford, GB, vol. 49 (7), Jul. 1, 2008, pp. 1946-1950.
He et al., "Fabrication of aluminum carbide nanowires by a nano-template reaction", Carbon, 48, (2010), pp. 931-938.
Kosolapova, Carbides, Properties, Production, and Applications, Plenum Press, 1971.
Nishi et al., "Formation and magnetic characteristics of cobalt—carbon nanocluster magnets embedded in amorphous carbon matrices", Chem. Phys. Letters, 369, 1-2, 198-203 (2003).
Nuernberg et al., "Methane conversion to hydrogen and nanotubes on Pt/Ni catalysts supported over spinel MgAl2O4", Catalysis Today, vol. 176, Issue 1, Nov. 1, 2011, pp. 465-469.
S. Reynaud, "Fabrication and characterization of carbon and boron carbide nanostructured materials", PhD thesis, Rutgers Univ., 2010.
Rodygin et al., Calcium Carbide: A Unique Reagent for Organic Synthesis and Nanotechnology, Chem. Asian J., 2016, 11, 7, 965-976.
Schmuecker et al., "Formation Mechanism of Nanostructured Metal Carbides via Salt-Flux Synthesis", Inorganic Chemistry, 2015, 54(8), pp. 3889-3895.
Schnepp et al., Synthesis of Highly Magnetic Iron Carbide Nanoparticles via a Biopolymer Route, Chem. Mater. vol. 22(8), pp. 5340-5344 (2010).
Serban et al., "Hydrogen Production by Direct Contact Pyrolysis of Natural Gas", Fuel Chemistry Division Preprints 20 02, 47(2), 746.
Streletskii et al.,"Mechanochemical Actuvatuib of Aluminum. 4. Kinetics of Mechanochemical Synthesis of Aluminum Carbide", Colloid Journal, 2006, vol. 68, No. 4, pp. 470-480.
Sun et al., "Field nanoemitter: One-dimension Al4C3 ceramics", Nanoscale, 2011, 3, 2978-2982.
Sun et al., "Carbon-in-Al4C3 Nanowire Superstructures for Field Emitters", ACSNano, 2011, vol. 5, No. 2, 932-941.
Sun et al., "Synthesis of Al4C3 nanowalls via thermal evaporation and potential application in vacuum microelectronic devices as cold electron emitters", Cryst. Eng. Comm., 2012, 14, 7951-7957.
Vorozhtsov et al., "Synthesis, Structure, and Phase Composition of Al—Al4C3 Nanostructured Materials", Russian J. of Non-Ferrous Metals, 2012, 53, 5, pp. 420-424.
Yushin et al., "Carbide Derived Carbon" in Nanomaterials Handbook, CRC Press, Jan. 26, 2006; Chpt 8.
Zhang et al., "Lithium-Assisted Self Assembly of Aluminum Carbide Nanowires and Nanoribbons" Nano Letters, (2002), vol. 2(2), pp. 105-108.
Ke Wang, "The preparation of hydrogen over molten metal and the synthesis of methyl 3, 3-dimethylpropionate over homogeneous catalyst", thesis, Hunan University (2009)—in Chinese with English abstract.

(56) References Cited

OTHER PUBLICATIONS

Zhou et al., Unsupported nickel catalysts for methane catalytic decomposition, AlChE Journal, vol. 60(8), Aug. 2014, pp. 2907-2917 (Abstract only).

Davenport, "Harry Kroto's last words on carbine", vol. 94, issue 20, pp. 8-10 (2016).

Khanna R., et al, "Formation of carbyne-like materials during low temperature pyrolysis of lignocellulosic biomass: A natural resource of linear sp carbons", Scientific Reports, 7, 1, (2017).

Davenport, "Contention Over Carbyne", vol. 93, issue 46, pp. 30-31 (2015).

Bitao Pan et al, "Carbyne with finite length: The one-dimensional sp carbon", Science Advances.

Casari, et al, "Carbyne: from the elusive allotrope to stable carbón atom wires", Department of Energy, Politecnico di Milano via Ponzio (2018).

Povov, A., Molecular Nanostructures, Carbon hybridization and allotropes.

Leduc et al., "Chemical and Electrochemical Oxidation of Aqueous Solutions of NADH and Model Compounds," Bioelectrochemistry and Bioenergetics, 1, 96-107 (1974).

Kikuti et al., "Chemical and Electrochemical Coloration of Stainless Steel and Pitting Corrosion Resistance Studies," J. Braz. Chem. Soc., vol. 15, No. 4, Jul./Aug. 2004.

Lunak et al. "One Electron vs. Two Electron Electrochemical and Chemical Oxidation of Electron-Donor Substituted Diketo-pyrrolo-pyrroles," Electrochemica Acta, 106, Sep. 1, 2013, 351-359. (Abstract only).

Zabik et al. "Selective Electrochemical versus Chemical Oxidation of Bulky Phenol," J. Phys. Chem. B, 2016, 120 (34), 8914-8924. (Abstract Only).

Inzelt (Ed.), "Chemical and Electrochemical Syntheses of Conducting Polymers," Conducting Polymers, Chapter 4, pp. 123-135, Springer 2008.

Anonoymous: "Calciumcarbid", Oct. 31, 2014 (Oct. 31, 2014), XP055475945,Retrieved from the Internet: URL:https://de.wikipedia.org/w/index.php?title=Calciumcarbid&oldid=133583939 [retrieved on May 16, 2018].

Anonymous: "Carbide", Oct. 12, 2014 (Oct. 12, 2014), XP055475952, Retrieved from the Internet: URL:https://en.wikipedia.org/w/index.php?title=Carbide&oldid=629275255 [retrieved on May 16, 2018].

Database WPI, Thorrmpson Scientific, London, GB, an May 26, 2004, pp. 605110.

International Search Report and Written Opinion received in connection with International Application No. PCT/US2017/028405; dated Dec. 8, 2017.

Supplemental European Search Report Received in connnection with European Application EP 14764834.9 (dated May 12, 2017)—Replaces ESR of Nov. 16, 2016.

Search Report received in connection with Singapore Application No. 11201703092Q; dated Jul. 5, 2018.

\* cited by examiner

PROCESS FOR PURE CARBON PRODUCTION

CROSS REFERENCE TO RELATED APPLICATIONS

This application is a continuation of U.S. patent application Ser. No. 15/618,802, filed Jun. 9, 2017, which is a continuation of U.S. patent application Ser. No. 14/213,533, filed on Mar. 14, 2014, which claims priority to U.S. Provisional Application No. 61/798,198, filed Mar. 15, 2013, and which applications are incorporated herein by reference in their entireties.

FIELD

The disclosure provides for methods of oxidizing carbide anions, or negative ions, from salt like carbides at low temperatures below about 600° C. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

BACKGROUND

Carbides are chemical compounds containing carbon and an element with lower electronegativity, or less of an ability to attract electrons. Nearly all elements react with elemental carbon to produce carbides. They are further classified into four groups: salt-like carbides, covalent carbides, interstitial carbides, and intermediate transition metal carbides. Salt-like carbides react with water and dilute acids to produce metallic cations and hydrocarbon gases. Intermediate transition metal carbides also react with dilute acid and sometimes water to produce hydrocarbons, metallic cations and sometimes hydrogen.

The salt-like carbides are further broken down into methanides, acetylides, and sesquicarbides. Methanides react with water to produce methane. Methane includes a carbon atom bonded to four hydrogen atoms in an sp3 hybridization. Two examples of these methanides are aluminum carbide ($Al_4C_3$) and beryllium carbide ($Be_2C$). Acetylides are salts of the acetylide anion $C_2^{2-}$ and also have a triple bond between the two carbon atoms. Triple bonded carbon has an sp1 hybridization and two examples of acetylides are sodium carbide ($Na_2C_2$) and calcium carbide ($CaC_2$). Sesquicarbides contain the polyatomic ion $C_3^{4-}$ and contains carbon atoms with an sp1 hybridization. Two examples of sesquicarbides are magnesium ($Mg_2C_3$) and lithium ($Li_4C_3$).

In 1919, patents were filed that defined an oxidation reaction to produce potassium metal by reacting potassium cations (positive ions) with acetylide anions from calcium carbide. The reacting medium was molten potassium fluoride. This is shown in the reaction in Equation (1) below:

Equation 1

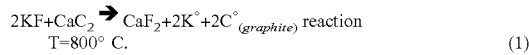

$$2KF + CaC_2 \rightarrow CaF_2 + 2K° + 2C°_{(graphite)} \text{ reaction} \quad T=800° C. \tag{1}$$

The other products of that reaction are calcium fluoride and graphite. Graphite is the most thermodynamically stable form of elemental carbon, and this is therefore the favored product at high temperature. This reaction, the reduction of the potassium ion, takes place at about 800° C. which would be considered high temperature since 600° C. is red heat.

SUMMARY

The disclosure provides for a method of oxidizing carbide anions and/or negative ions from carbides by oxidizing carbide anions at a reaction temperature of below 600° C., wherein the reaction produces an allotrope of carbon in an sp1 and/or sp3 configuration.

In another aspect, the disclosure provides for a method of producing pure elemental allotropes of carbon by oxidizing salt-like carbide anions and/or intermediate carbide anions at a reaction temperature of below 600° C.

In yet another aspect, the disclosure provides for a method of producing diamonds by reacting carbides with molten metallic halide salts at temperatures below 600° C.

The disclosure also provides for a method of controlling a carbon allotrope by controlling the reduction potential of a low melting point halide salt reactant by varying the reduction potential of cations and/or changing the temperature of the melt.

In an aspect, the carbide anions are salt-like or intermediate carbide anions. In another aspect, the salt-like carbide anions are selected from the group consisting of methanides, acetylides, and sesquicarbides. In another aspect, the salt-like carbide anion is calcium carbide.

In an aspect, the methods described herein produce an allotrope of carbon in an sp1 configuration. In yet another aspect, the methods described herein produce an allotrope of carbon in an sp3 configuration.

The method disclosure also provides for methods described herein wherein the reaction temperature is below 300° C. and methods described herein further including adding a salt with a melting point of less than 250° C. as a reactant.

DETAILED DESCRIPTION

In an aspect, the disclosure provides for methods of oxidizing carbide anions, or negative ions, from salt like carbides at low temperatures below about 600° C. Oxidization means that the ion being oxidized gives up electrons. The negative ions of the salt like carbides are reacted to produce elemental carbon in its various allotropes, or crystal structures, with sp1, sp2, and/or sp3 hybridizations. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

The methodology described herein can be distinguished from previous reactions patented in 1919 for several reasons. For one, the reaction in equation (1) occurs at high temperatures of around 800° C. in previously known reaction mechanisms whereas the methodology described herein includes reactions at lower temperatures below around 600° C. Second, the reaction in equation (1) only produces graphite as a pure carbon product. Graphite is a crystalline allotrope of carbon with an sp2 hybridization. Until now, it was not recognized that such a reaction provides for a diamond with an sp3 hybridization, superconducting material with an sp1 hybridization, fullerenes, carbon nano tubes, or any of other forms of pure carbon. To this end, the disclosure differentiates from what was previously recognized in the art.

In an aspect, the first step of the reaction system is to oxidize the carbide ions at low temperature below 600° C., but typically the reactions occur below 300° C. The reactions use low melting point salts, for example stannous chloride ($SnCl_2$), that have melting points less than 280° C. as the reactants. The reaction medium is the molten salt, for example, molten stannous chloride. This means that there is an excess of salt during the reaction which takes place in the molten salt liquid. Chemically, the cation (positive ion) of the salt is reduced to the elemental state. Therefore, stannous ion $Sn^{+2}$ would become elemental tin (Sn°). The standard reduction potential of the stannous ion $Sn^{+2}$ is only about –0.136V. Reduction potential refers to the ability of a chemical species to acquire electrons and thus have its charge reduced. So not much energy is required to reduce the stannous ion, therefore the reaction reacts to completion. There is an excess of reduction potential in the carbide anions since they are shown to reduce the potassium ion in Equation (1) which requires –2.94V.

The reduction of $Sn^{+2}$ by acetylide or any carbide anion is not mentioned anywhere in the literature. Only certain metallic salts are applicable for this reaction. It is preferred that the cation of the salt does not produce a carbide by direct reaction with carbon at low temperatures or the temperature of the reduction reaction. If the cation does produce carbide, then pure carbon would not be produced. Examples of the preferred salts contain tin, lead, mercury, and zinc. Furthermore, the salts must have a low melting point. The temperature of the reaction must be high enough to melt the salts but low enough to control the electronic hybridization of the carbon. As mentioned in the background information, graphite is the most thermodynamically stable form of pure carbon. So if the temperature of the reaction is too high, the pure carbon will form crystalline graphite in the sp2 hybridization instead of the desired sp1 or sp3 hybridizations.

The next item in the reaction system is the low temperature oxidation of methanides to produce diamond, or carbon in that has an sp3 hybridization. Aluminum carbide ($Al_4C_3$) and beryllium carbide ($Be_2C$) are the only two known salt like carbides that produce methane when they react with water. The methane molecule contains a carbon atom in the sp3 hybridized state, which is the same as diamond. The idea is to oxidize the methanide anion in a controlled manner at temperatures low enough to maintain the electronic configuration, or sp3 hybridization and produce diamond. Thus, the controlled oxidization of aluminum carbide at low enough temperatures will preferentially produce diamonds. This reduction takes place at about 280° C. and atmospheric pressure.

Oxidation of the methanide (aluminum carbide) anion in molten tin halide salt blends to produce diamond. There is no literature that mentions the reduction of aluminum carbide much less anything that mentions this reaction to produce diamond, or sp3 hybridized carbon. Experiments for this reaction have been carried out using stannous fluoride ($SnF_2$) and stannous chloride ($SnCl_2$), which have melting points of 214° C. and 235° C., respectively. These reactions can be seen in Equation (2) and Equation (3) below:

Equation 2

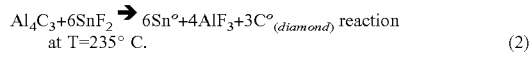
$Al_4C_3+6SnF_2 \rightarrow 6Sn°+4AlF_3+3C°_{(diamond)}$ reaction at T=235° C. (2)

Equation 3

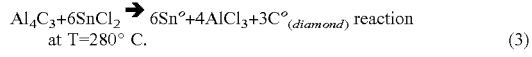
$Al_4C_3+6SnCl_2 \rightarrow 6Sn°+4AlCl_3+3C°_{(diamond)}$ reaction at T=280° C. (3)

The proof of the diamond, or carbon with sp3 hybridization, material produced was established using X-Ray Diffraction patterns (XRD) both at WVU and independently at Wright Patterson Air Force Base. Early diamond production studied certain metallic catalysts needed to make diamonds. These catalysts gave similar XRD patterns to diamonds which caused some confusion. However, no metallic catalysts or catalysts of any kind were used in this system of reactions. The fact that diamonds were produced was unexpected and provides support for the experiments described herein.

Since the chemical hypothesis to maintain the sp3 hybridization of pure carbon is confirmed with the production of diamonds, it can extended to include the potential superconducting material to maintain the sp1 hybridization of pure carbon. From the literature, there have been many different attempts to make this material but none have been successful. The process begins with a carbide that contains carbon in an sp1 hybridized state. As mentioned in the background information, acetylides have the ability to satisfy this requirement. The most common example is calcium carbide ($CaC_2$). However, sp1 carbon in the acetylide anion can be reconfigured even at very low energy or low temperatures. A more desired reactant is one that has a tendency to maintain the sp1 configuration throughout the rigors of the reaction. The disclosure provides for two compounds that have the ability to act as a sufficient reactant: magnesium sesquicarbide ($Mg_2C_3$) and lithium sesquicarbide ($Li_4C_3$), also mentioned in the background information. From the literature, a structural analysis using X-Ray diffraction was completed and shows that two of the carbon atoms are equivalent with an sp1 configuration. With a hydrolysis reaction, methyl acetylene ($CH_3C_2H$) is produced. One terminal carbon, the methyl carbon ($CH_3$) end is sp3 in nature while the other two carbons maintain their sp1 character. The goal is to polymerize the carbon atoms while maintaining the sp1 configuration. This would produce a completely new allotrope of carbon that has an sp1 configuration. Due to the electronic properties of such a material, it may be a high temperature superconductor. Based on the literature, this approach has never been attempted.

EXAMPLES

Example 1

In an oxygen moisture free environment, aluminum carbide, $Al_4C_3$ was ground to less than 20 mesh. A quantity of anhydrous stannous chloride, $SnCl_2$ was blended with the ground aluminum carbide at twice the stoichiometric ratio for the reaction below

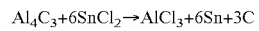
$Al_4C_3+6SnCl_2 \rightarrow AlCl_3+6Sn+3C$

The blend was poured into a glass ampoule that was subsequently placed into a stainless steel tube. The stainless steel tube was sealed and removed from the controlled environment. The tube and its contents were heated to 280° C. for 2 hours. The contents of the ampoule were washed with 6M HCl to remove all the aluminum chloride, excess stannous chloride and Sn metal. The remaining carbon was in two forms (1) a graphene like compressed set of platelets and (2) a cubic/orthorhombic diamond like structure. The preponderance of the carbon product was the latter structure.

Example 2

In an oxygen moisture free environment, calcium carbide, $CaC_2$ was ground to less than 20 mesh. A quantity of anhydrous zinc chloride, $ZnCl_2$ was blended with the ground aluminum carbide at twice the stoichiometric ratio for the reaction below

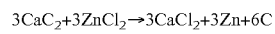
$3CaC_2+3ZnCl_2 \rightarrow 3CaCl_2+3Zn+6C$

The blend was poured into a glass ampoule that was subsequently placed in a stainless steel tube. The stainless steel tube was sealed and removed from the controlled environment. The tube and its contents were heated to 425° C. for 2 hours. The contents of the ampoule were washed with 6M HCl to remove all the Zinc chloride, calcium chloride, and Zn metal. The remaining carbon was in two forms (1) a graphene like compressed set of platelets and (2) a cubic/orthorhombic diamond like structure. The preponderance of the carbon product was the latter structure.

Example 3

In an oxygen moisture free environment, calcium carbide, $CaC_2$ was ground to less than 20 mesh. A quantity of anhydrous stannous chloride, $SnCl_2$ was blended with the ground aluminum carbide at twice the stoichiometric ratio for the reaction below

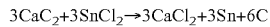
$$3CaC_2 + 3SnCl_2 \rightarrow 3CaCl_2 + 3Sn + 6C$$

The blend was poured into a glass ampoule that was subsequently placed in a stainless steel tube. The stainless steel tube was sealed and removed from the controlled environment. The tube and its contents were heated to 280° C. for 2 hours. The contents of the ampoule were washed with 6M HCl to remove all the stannous chloride, calcium chloride, and Sn metal. The remaining carbon was in only one form a graphene like compressed set of platelets

What is claimed is:

1. A method for the production of carbon with a diamond or graphene like structure comprising: chemically oxidatively reacting a ground carbide chemical compound with an anhydrous molten metal salt reactant at a reaction temperature of below 600° C. in an oxygen, moisture free environment to form a reaction product comprising carbon from the oxidation of the ground carbide chemical compound and also to form a reaction product which is elemental metal from the reduction of the cation of the anhydrous metal salt, wherein the chemical oxidative reaction takes place in the anhydrous molten metal salt, and wherein the anhydrous metal salt is used in excess with respect to the ground carbide chemical compound.

2. The method of claim 1, wherein the carbide is aluminum carbide, the metal salt is stannous chloride, and the reaction temperature is below 300° C.

3. The method of claim 2, wherein the excess is an excess of at least twice the stoichiometric ratio, and wherein the reaction temperature is 280° C. or below.

4. The method of claim 2, wherein the carbon comprises carbon with a diamond like structure.

5. The method of claim 1, wherein the carbide is calcium carbide, wherein the metal salt is zinc chloride, and wherein the reaction temperature is below 600° C.

6. The method of claim 5, wherein the excess is an excess of at least twice the stoichiometric ratio, and wherein the reaction temperature is 425° C. or below.

7. The method of claim 5, wherein the carbon comprises carbon with a diamond like structure.

8. The method of claim 1, wherein the carbide is calcium carbide, wherein the metal salt is stannous chloride, and wherein the reaction temperature is below 300° C.

9. The method of claim 8, wherein the excess is an excess of at least twice the stoichiometric ratio, and wherein the reaction temperature is 280° C. or below.

10. The method of claim 8, wherein the carbon comprises carbon with a graphene like structure.

* * * * *